(No Model.) 3 Sheets—Sheet 1.

G. F. FISCHER.
SELF LOADING VEHICLE.

No. 499,102. Patented June 6, 1893.

WITNESSES:
C. Neveux
C. Sedgwick

INVENTOR
G. F. Fischer
by Munn & Co
ATTORNEYS.

(No Model.) 3 Sheets—Sheet 2.

G. F. FISCHER.
SELF LOADING VEHICLE.

No. 499,102. Patented June 6, 1893.

WITNESSES:
C. Neveux
C. Sedgwick

INVENTOR
G. F. Fischer
BY Munn & Co
ATTORNEYS.

(No Model.) 3 Sheets—Sheet 3.

G. F. FISCHER.
SELF LOADING VEHICLE.

No. 499,102. Patented June 6, 1893.

WITNESSES:
C. Neveux
C. Sedgwick

INVENTOR
G. F. Fischer
BY Munn & Co.
ATTORNEYS.

UNITED STATES PATENT OFFICE.

GEORGE FRANCIS FISCHER, OF ROCHESTER, NEW YORK.

SELF-LOADING VEHICLE.

SPECIFICATION forming part of Letters Patent No. 499,102, dated June 6, 1893.

Application filed July 30, 1892. Serial No. 441,678. (No model.)

*To all whom it may concern:*

Be it known that I, GEORGE FRANCIS FISCHER, of Rochester, in the county of Monroe and State of New York, have invented a new and useful Improvement in Vehicles, of which the following is a full, clear, and exact description.

My invention relates to an improvement in wagons and similar vehicles, and has for its object to construct a wagon which may be expeditiously and conveniently converted for use as a loading wagon, and wherein also when the body of the wagon has received its load it may be as readily and conveniently placed in a carrying position, the loading apparatus being at that time elevated above the ground, and the body of the wagon will occupy virtually the same position as that of an ordinary wagon.

Another object of the invention is to construct the wagon in such a manner that the load carried thereby may be dumped from the bottom, and whereby the dumping mechanism may be manipulated by the driver without inconvenience, and wherein also the dumping and the restoration of the body of the wagon to its original or carrying position may be quickly effected.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1:
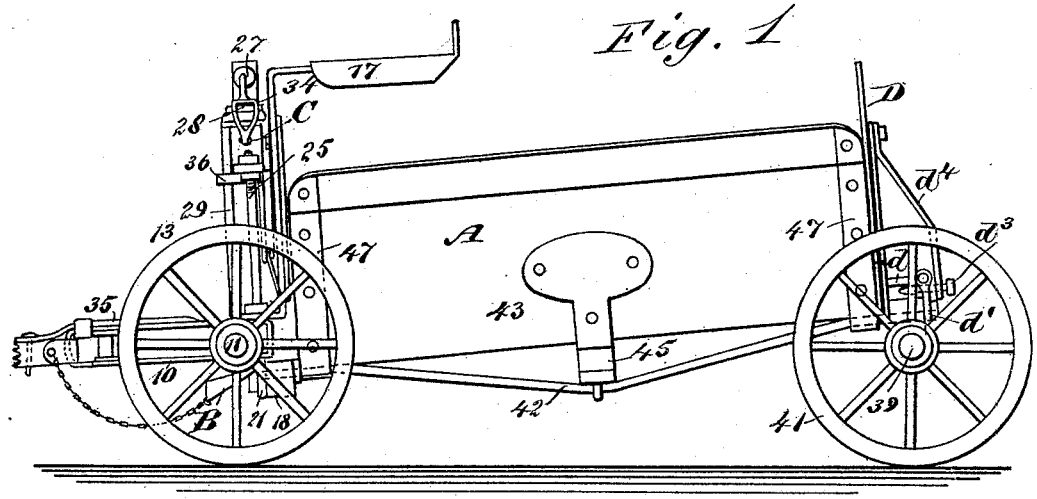
Figure 2:
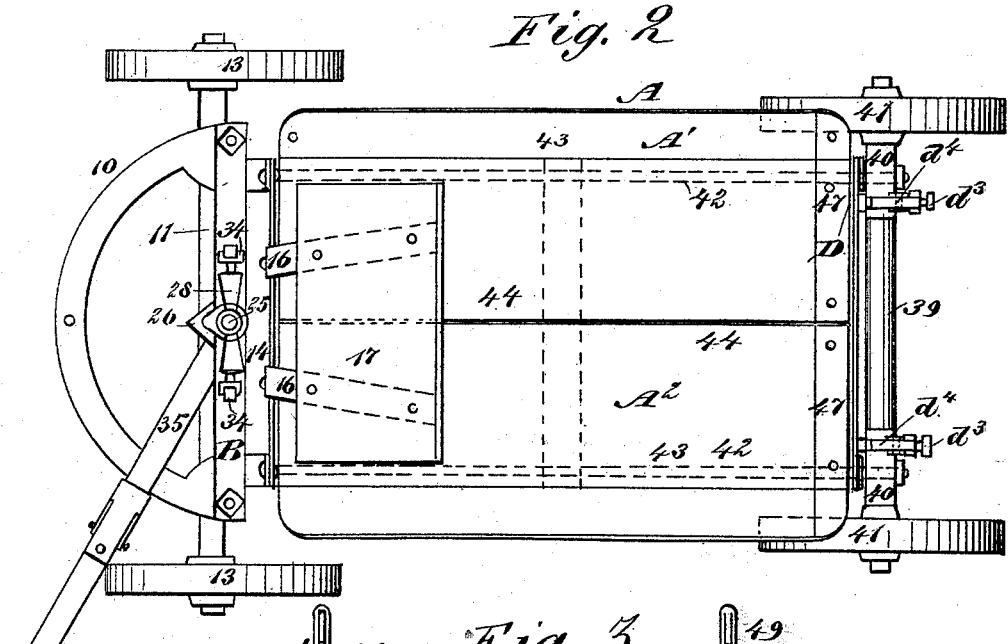
Figure 3:
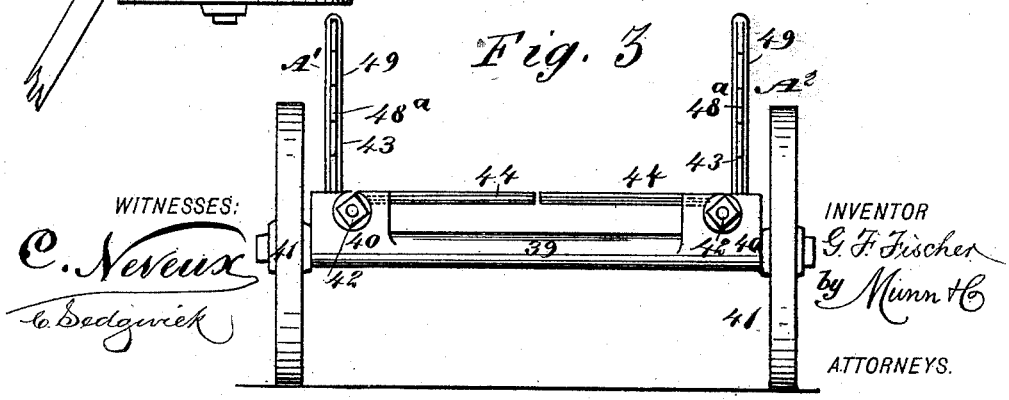
Figure 4:
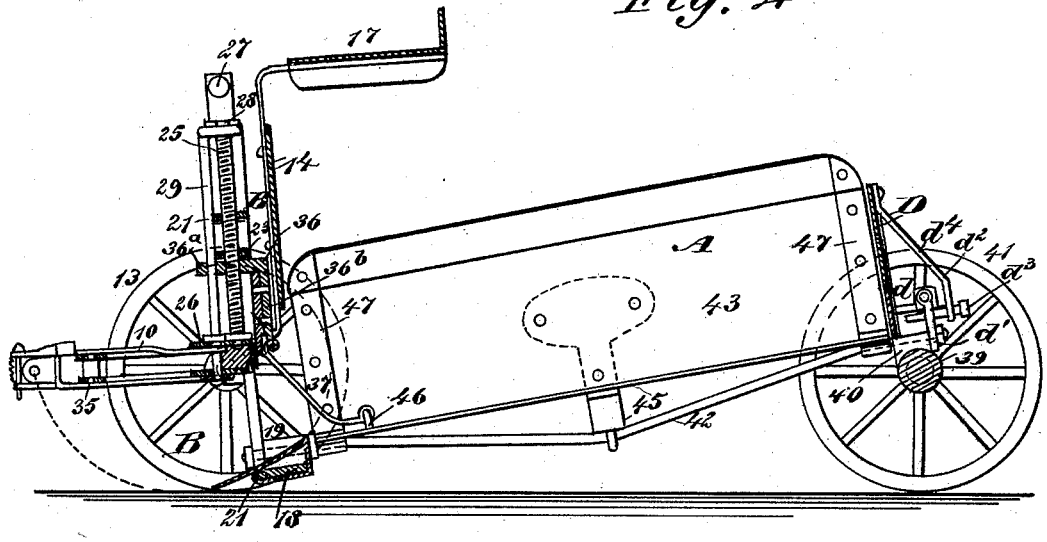
Figures 5, 10:
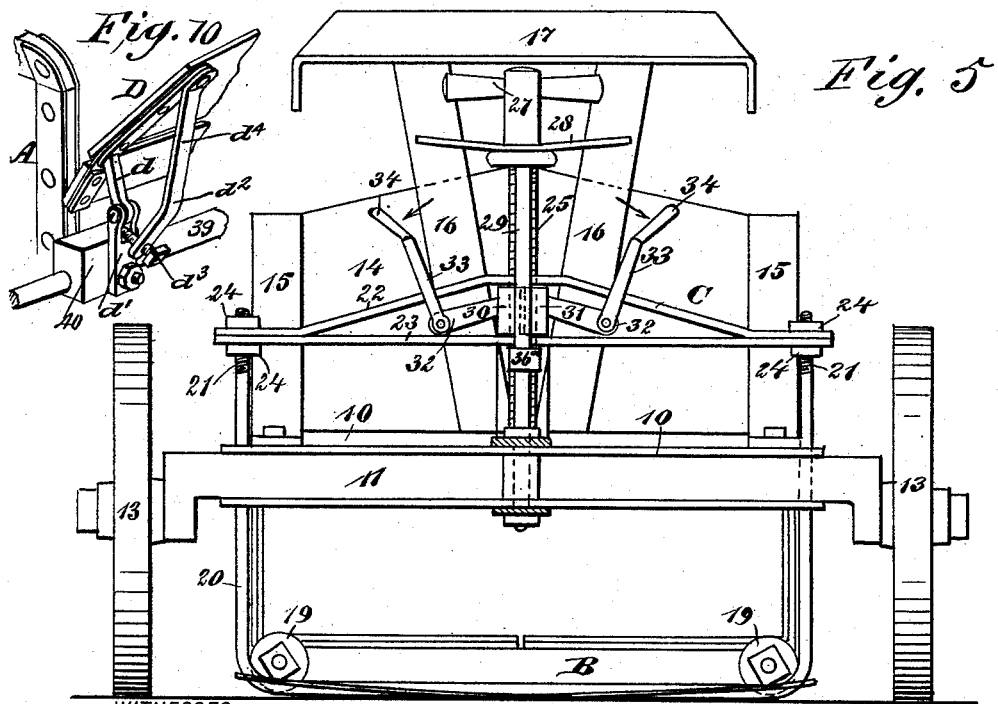
Figure 6:
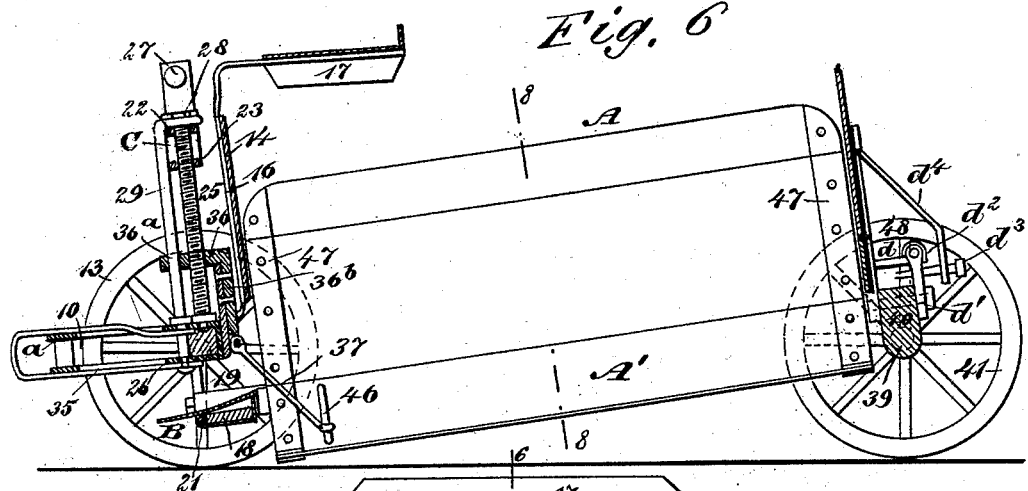
Figure 7:
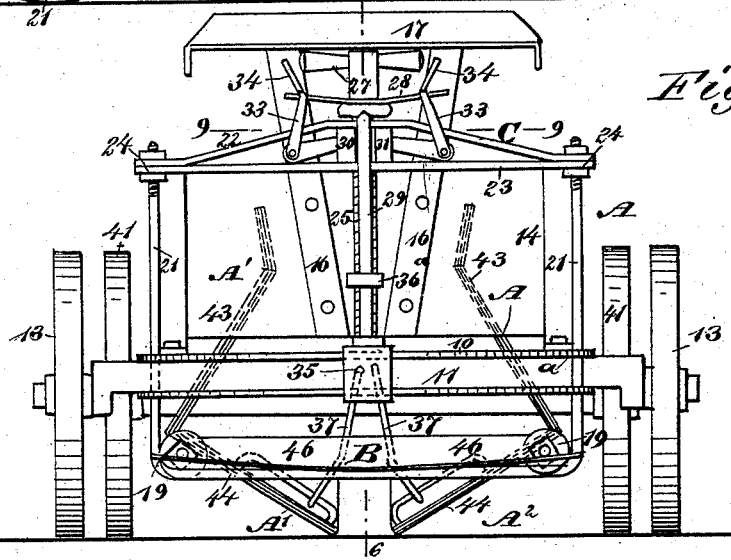
Figures 8, 9:
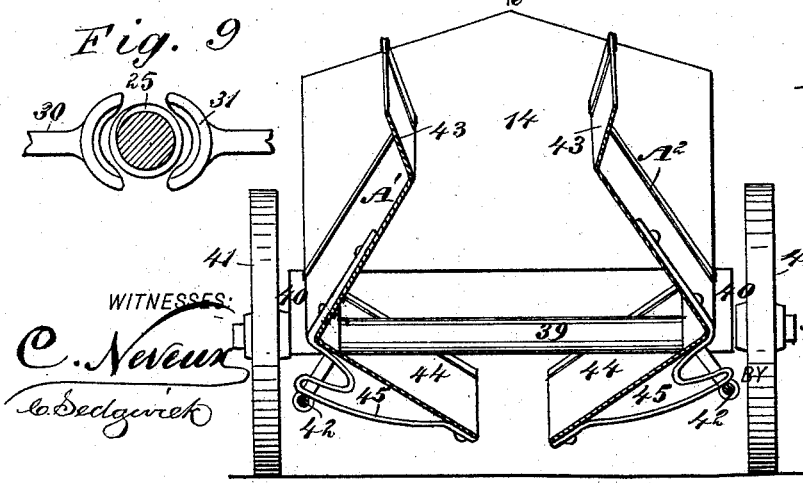

Figure 1 is a side elevation of a wagon illustrating the body thereof in its carrying position. Fig. 2 is a plan view of the wagon. Fig. 3 is an end view of a wagon slightly modified in construction, the tail-board being removed. Fig. 4 is a longitudinal vertical section through the wagon, the body thereof being shown in its loading position, and Fig. 5 is a front view of the wagon when in the position shown in Fig. 4. Fig. 6 is a longitudinal vertical section through the wagon the body thereof being in its dumping position and the section being taken practically on the line 6—6 of Fig. 7. Fig. 7 is a front elevation of the wagon, the body being also in its dumping position. Fig. 8 is a vertical transverse section through the body in its dumping position, the section being indicated by the line 8—8 of Fig. 6. Fig. 9 is a horizontal section through the adjusting screw of the wagon the section being taken essentially on the line 9—9 of Fig. 7, and Fig. 10 is a detail perspective view.

In carrying out the invention the front portion of the wagon consists preferably of a horizontally located segmental frame 10, which frame is open at its front portion, the opening extending through to the back, said opening being indicated in the drawings by the reference letter *a*. Close to the back of this segmental frame the forward axle 11 is located, and the axle at its extremities is provided with the usual supporting wheels 13.

The front board 14 of the body A of the wagon is rigidly attached to the rear portion of the front frame 10 by means of uprights 15, or the equivalents thereof, and ordinarily the front board 14 is provided at each side of its center with supports 16 for the driver's seat 17, the said supports being attached to the front board, and they extend above it and rearwardly over it, as shown in Figs. 5 and 6.

Beneath the segmental frame 10 a shovel B, is located, the upper surface of the shovel being inclined downward, and it is transversely given a somewhat dished shape. This shovel is attached to the front portion of the body A of the wagon, and at its bottom is reinforced at its rear edge preferably by a wide bar 18, which bar extends from side to side, and this bar has lugs 19, formed at its ends upon its upper face, the shovel being cut away at the rear portion to admit of the formation of these lugs, but the front of the shovel extends across and in front of them. The shovel is supported primarily by means of a yoke 20, the lower or horizontal portion of the yoke extending beneath the shovel, and it is attached to the front of the strengthening bar 18, while the upright members of the yoke extend upward outside of the lugs of the strengthening bar and pass through openings made in the segmental frame 10, and the said vertical members of the yoke are carried some distance above the frame, and their upper ends are threaded as shown best at 21 in the drawings. The upper ends of the vertical members of the yoke are connected by a truss C, and this truss consists of an upper arched bar 22 and a lower straight bar 23, whereby a space is provided between the two bars at their centers and at each side of their centers, while the ends of the bars are brought together and the yoke members pass through them, they being attached to the yoke members by means of nuts 24, or the equivalents thereof, arranged one above and the other below the two bars.

The central portion of the arched bar 22 of the truss structure is flattened, and through both bars of the structure an adjusting screw 25, is passed, the screw being led through openings in the bars of greater diameter than the diameter of the screw, so that the screw may turn freely therein. The lower end of this adjusting screw is swiveled in a platform 26, formed at the central rear portion of the front segmental frame 10, and above the yoke-like structure the adjusting screw is provided with a suitable head or handle 27, whereby it may be readily turned, and below the head or handle a cross bar 28, is carried by the screw, the ends of the said cross bar being preferably given an upward inclination. The adjusting screw is stiffened and maintained in its vertical position through the medium of a vertical brace rod 29, the lower end of which is attached to the platform 26 of the front segmental plate 10 at the front portion of said platform. The brace bar is then carried upward outside of and above the truss structure C, and is carried loosely around the adjusting screw. The adjusting screw is made to operate upon the shovel through the medium of two semi-circular nuts 30 and 31. One of these nuts is located at each side of the adjusting screw, between the straight and the arched bars of the truss structure, and each nut is provided with a shank 32, as shown best in Fig. 5, extending in the direction of the ends of the truss, and each shank has pivotally attached thereto the lower end of a lever 33. These levers are passed upward through openings in the upper or arched bar of the truss structure, and at their upper ends have loops or eyes 34, formed thereon, capable of being passed over the ends of the cross bar 28, as shown in Fig. 7, and the nuts 30 and 31 are carried and kept out of engagement with the adjusting screw; but when the levers 33, are disengaged from the cross bar 28 and are pressed outward or in direction of the sides of the wagon they engage with the adjusting screw, and each nut has its inner face, or clamping face, threaded correspondingly with the screw, so that at this time when the adjusting screw is turned in one direction the truss bar is forced to travel downward, and consequently the shovel will be lowered, and when the screw is turned in the opposite direction the shovel will be elevated; but when the nuts 30 and 31 are disengaged from the adjusting screw the latter has no effect whatever upon the shaft when it is manipulated.

The front segmental frame 10, is provided with a horizontal slot $a$ in the interest of lightness; and in fact, to that end, the frame is usually made of skeleton form. The frame not only serves as a support for the front board of the body but it also acts as a guide for a clevis 35 to which the pole is to be secured, and this clevis extends over the top and the bottom of the frame, and at its inner end is pivotally secured thereto, usually by passing the lower end of the vertical stay rod 29 through the inner end of the clevis, as shown in Fig. 6.

The front structure of the wagon is completed by the addition of what I term a dumping block 36. This block is preferably made somewhat L-shaped or angular in general contour, comprising a horizontal member $36^a$ and a vertical member $36^b$. The horizontal member has guided movement upon the stay or brace rod 29, and this member is provided with a threaded aperture through which the adjusting screw 25, passes so that by the manipulation of this screw the dumping block may be raised and lowered. The vertical member of the dumping block has attached at or near its lower end two links 37, and these links are adapted for engagement with the body of the wagon, as will be hereinafter set forth.

The body of the wagon is provided with a rear axle 39, and this axle near each end is provided with an upward extension or lug 40, and at each extremity of the axle a rear supporting wheel 41, is journaled.

A truss rod 42, is located at each side of the wagon, the rods being downwardly curved, as illustrated in the side views of the drawings. One end of each rod is secured in a lug or extension of the brace bar 18 of the shovel, the said lugs or extensions being designated as 19; and the opposite ends of the truss rods are passed through the lugs or extensions 40 of the rear axle, and to both of these lugs or extensions the truss rods are securely fastened.

The body A of the wagon is made in two sections only, and said sections are designated as A' and $A^2$. Each section is practically L-shaped or angular in cross section, comprising an upright member 43 and a horizontal member 44; the sections of the body are preferably constructed of metal. The top portion of the vertical members of the sections may be straight, or they may be flared outward, as shown in the drawings. At the angle of the sections, or at the junction of their members, each section is pivotally connected with a truss rod 42; in fact, the sections are hinged upon the truss rods, and they need only to engage directly with the truss rods near the ends of the latter, but by the addition of central brackets 45, secured to the central portions of the section of the body the latter have hinged connection with the central portions of the truss rods. When the body is in a position to receive and carry a load the horizontal members of the sections closely approach each other, as shown in Fig 2, and the sections are manipulated, that is, carried to a dumping position or held in a carrying position, through the medium of the adjusting screw 25, the dumping block 36 and the links 37, the links being attached one to the bottom or horizontal portion of each section of the body at the forward end thereof; and ordinarily the links are shaped at their inner or lower ends to slide upon travelers 46, secured to the bottom members of the body sections. The body sections are braced or strengthened transversely through the medium of tie strips 47, located at any point in their length, ordinarily at the ends, both inside and outside of the body, and the tie strips extend the full length of each section. The body, as has heretofore been stated, is entirely independent of the front board, and it is also independent of the tail board, the latter being designated as D in the drawings. The tail board is made in two horizontal sections, and the lower section, which is the narrower, is connected at its ends with the upper section by means of springs, preferably flat springs. The tail board has a hinge connection with the rear axle, and the hinges are located one near each side, comprising two members $d$ and $d'$. The member $d'$ of each hinge is secured to an extension of the rear axle, as shown in Figs. 4 and 6, and projects vertically upward above said extensions, the upper ends of these members being forked. The horizontal members $d$ of the hinges are secured to the upper face of the tail board, and terminate at their outer ends in heads $d^2$, which latter are pivoted in the forked ends of the members $d'$. The tail board is prevented from swinging backward when the wagon is loaded, or when it is desired to retain the tail board in place, by passing a key $d^3$ through the fork of the members $d'$ to an engagement, or practically to an engagement, with the under face of the head portion of the members $d$. It is evident that when the tail board is thrown rearward upon its hinges, the spring connecting the two sections will yield and allow the tail board to freely pass the ends of the side board. The keys $d^3$ also serve as an anchorage for the lower ends of braces $d^4$, which at their upper ends are pivotally attached to the upper portion of the tail board. When the tail board is to be lowered the keys are removed and the braces swung to one side, and then the tail board may be lowered upon its hinges.

In some character of wagons it is necessary and desirable that every part possible should be constructed of metal, and such a wagon is illustrated in all of the figures of the drawings with the exception of Fig. 3, in which the body is shown as constructed of wood; its shape is the same as has been heretofore described, but the sections of the body are made up of a series of slats $48^a$, held together in proper form by straps 49, or the equivalents thereof; but the sections of the body may be made in any other manner found advantageous.

When the wagon is to be used as a loading wagon the body is manipulated as follows: The levers 33, are disengaged from the cross bar 28 of the adjusting screw and pressed downward and outward; the screw is then turned in a manner to carry the nuts 30 and 31 downward, as at that time they are in engagement with the screw, and in carrying the nuts downward, as they are between the bars of the truss C and that is connected directly with the shovel and the shovel with the body, the body and the shovel will be lowered but the sections of the body will not be dumped as the dumping block 36, will travel downward proportionately with the nuts 30 and 31. When the shovel strikes the ground the parts will be in the position shown in Figs. 4 and 5. By driving the team forward over or into the pile of coal, sand, gravel or other material to be loaded the material will be forced upward into the body of the wagon, and when said body has received a proper load the adjusting screw is turned in an opposite direction, power is again exerted upon the levers 33 and the body will be brought upward to its carrying position. In the drawings the front board 14, is shown quite short, in order to disclose the mechanism within the body, but it will be understood that this front board is of sufficient length to extend downward to the bottom of the body when the latter is in its carrying position, suitable openings being made for the passage of the dumping links 37.

The load taken aboard in the above described manner, or in any other manner, when the dumping ground is reached, may be quickly and conveniently dumped. The loop ends of the levers 33 connected with the lower nuts 30 and 31, are carried upward and engaged with the cross bar 28, whereupon they are disengaged from the adjusting screw. The adjusting screw is then turned in a manner to cause the dumping block 36 to travel downward, and as this block travels downward, by reason of its link connection with the bottom members of the body, these members may be forced downward and outward while the side members will be forced inward and downward, as shown in Fig. 8, and the load will consequently be dumped from the body, as the body will not only be comparatively bottomless but the contents will be forced through the opening formed at the bottom by the inward inclination of the sides of the body. After the load has been dumped the body is restored to its normal or carrying position by carrying the adjusting screw in an opposite direction.

It will thus be observed that this wagon is not only capable of being employed as a self-loading wagon, but it may be used in the ordinary manner as a carrier, and may also be manipulated in such a manner as to quickly and thoroughly dump all of its contents.

Having thus described my invention, I claim as new and desire to secure by Letters Patent—

1. In a vehicle, the combination with a body having an open front end, and means for raising and lowering the forward end of the body, of a stationary front board for closing the front end of the body when it is raised, substantially as described.

2. In a vehicle, the combination with a body, of a stationary front board for closing the front end of said body, and means for raising and lowering the front end of the body, substantially as described.

3. In a vehicle, the combination with a body formed of two hinged sections, of a shovel on the front end of the body, a stationary front board and means for raising and lowering the front end of the body and for swinging the sections of the body to dump the load, substantially as described.

4. In a vehicle, the combination, with the forward and the rear axles and truss rods connecting them, of a body comprising two sections essentially L-shaped in cross section and pivotally connected with the truss rods, and an adjusting mechanism connected with the sections and capable of dumping or of raising them, as and for the purpose set forth.

5. In a vehicle, the combination, with a body and a support for the body, of a front board connected with the front body support, a sliding connection between the front of the body and its front support, a shovel located at the front of the body, and an adjusting screw connected with the shovel end of the body and capable of raising and lowering said end, whereby the body may be placed in position to load itself or may be carried upward to a carrying position, as set forth.

6. In a vehicle, the combination, with a front and rear support, of a body the front of which is open and provided with a sliding connection with its front support, a front board carried by the support and capable of closing the front of the body, a shovel located at the forward lower end of the body, an adjusting screw carried by the support, segmental nuts removably connected with the adjusting screw and connected with the sliding mechanism of the body, and levers connected with the said nuts and by means of which they are operated, as and for the purpose specified.

7. In a vehicle, the combination, with front and rear supports, a body pivotally connected with its rear support and having a sliding engagement with its front support, the front end of the body being open, and a front board attached to the front support and capable of closing the front end of the body, of a shovel located at the forward lower portion of the body, an adjusting screw carried by the support, segmental nuts capable of engagement with or of disengagement from the adjusting screw and connected with the sliding portion of the body front, levers connected with the segmental nuts, a locking device carried by the screw, and a means, substantially as shown and described, for fastening the levers and the locking device, as and for the purpose set forth.

8. In a vehicle, the combination, with a front and rear support and a body carried thereby, the body having pivotal connection with the supports and being constructed in two sections essentially L-shaped in cross section, of an adjusting screw carried by one of the supports, a dumping block carried by the adjusting screw, and links connecting each bottom member of the body with the dumping block, whereby the body may be dumped or raised to the carrying position, substantially as and for the purpose specified.

9. In a vehicle, the combination, with the body thereof, of a tail board having a hinged connection with the axle, and keys passed between the members of the hinges, substantially as shown and described.

10. In a vehicle, the combination, with the body and the rear axle, of a tail board hinged to the rear axle, keys removably passed between the knuckles of the hinges, and braces pivotally attached to the tail board and detachably connected with the keys, substantially as shown and described.

11. In a vehicle, a dumping body constructed in two sections substantially L-shaped in cross section and each provided with braces secured thereto, as and for the purpose specified.

12. In a dumping vehicle, the combination, with front and rear supports and truss rods connecting said supports, of a body constructed in two sections each essentially L-shaped in cross section, the sections having a hinged connection with the truss rods near the junction of their parts, as and for the purpose specified.

GEORGE FRANCIS FISCHER.

Witnesses:
JOHN H. HUBBARD,
LOVELLE M. GRUBE.